United States Patent
Baker et al.

(10) Patent No.: US 7,855,752 B2
(45) Date of Patent: Dec. 21, 2010

(54) METHOD AND SYSTEM FOR PRODUCING SEAMLESS COMPOSITE IMAGES HAVING NON-UNIFORM RESOLUTION FROM A MULTI-IMAGER SYSTEM

(75) Inventors: Henry Harlyn Baker, Palo Alto, CA (US); Donald O. Tanguay, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

(21) Appl. No.: 11/496,810

(22) Filed: Jul. 31, 2006

(65) Prior Publication Data

US 2008/0024390 A1  Jan. 31, 2008

(51) Int. Cl.
*H04N 9/74* (2006.01)
(52) U.S. Cl. .................. 348/588; 348/584; 348/159; 345/634
(58) Field of Classification Search ......... 348/578–601, 348/239, 159, 383; 345/629–641
See application file for complete search history.

(56) References Cited

U.S. PATENT DOCUMENTS 6,157,415 A * 12/2000 Glen ........................ 348/599
6,636,647 B1 * 10/2003 Ohki et al. ................. 382/284
2004/0263636 A1   12/2004 Cutler et al.

OTHER PUBLICATIONS

Cutler, R et al—"Distributed Meetings: A Meeting Capture and Broadcasting System"—Proc ACM Multimedia 2002—Conf 10—Dec. 1, 2002—pp. 503-512.
Baker, H Harlyn et al—"A Multi-Imager Camera for Variable-Definition Video (XDTV)"—Multimedia Content Representation—Lecture Notes in Computer Science vol. 4105 (200), 2006.
Zhu et al—"Fast Construction of Dynamic and Multi-Resolution 360<0> Panoramas From Video Sequences"—Image and Vision Computing—vol. 24 No. 1—Jan. 1. 2006 pp. 13-26.

* cited by examiner

*Primary Examiner*—M. Lee

(57) ABSTRACT

A method and system for producing seamless composite images having non-uniform resolution from a multi-imager system is disclosed. A plurality of lower resolution source images is acquired. In addition, a plurality of higher resolution source images is acquired. The plurality of the lower resolution images and the higher resolution images are then layered to produce a composite image, wherein the layering of the plurality of the lower resolution images and the higher resolution images to produce a composite image having a plurality of resolutions therein.

17 Claims, 12 Drawing Sheets

500

```
ACQUIRES A PLURALITY OF LOWER RESOLUTION SOURCE IMAGES.
502
          ↓
BLENDS THE LOWER RESOLUTION SOURCE IMAGES TO FORM A FIRST
RESOLUTION LAYER OF AN OVERALL SCENE.
504
          ↓
ACQUIRES A PLURALITY OF HIGHER RESOLUTION SOURCE IMAGES.
506
          ↓
BLENDS THE HIGHER RESOLUTION SOURCE IMAGES TO FORM A
SECOND RESOLUTION LAYER OF A PORTION OF THE OVERALL SCENE.
508
          ↓
LAYERS THE PLURALITY OF THE LOWER RESOLUTION IMAGES AND
THE HIGHER RESOLUTION IMAGES TO PRODUCE AT LEAST ONE
COMPOSITE IMAGE HAVING NON-UNIFORM RESOLUTION.
510
```

FIG. 5

METHOD AND SYSTEM FOR PRODUCING SEAMLESS COMPOSITE IMAGES HAVING NON-UNIFORM RESOLUTION FROM A MULTI-IMAGER SYSTEM

TECHNICAL FIELD

The present invention pertains to a method and system for producing seamless composite images having non-uniform resolution from a multi-imager system.

BACKGROUND ART

Some conventional image acquisition systems have the capacity to combine individual images for the purpose of producing composite images that detail an enlarged field of view. These image acquisition systems use methodologies that rely upon the capture of the images by one or more cameras. In order to combine the images that are captured, some conventional systems rely on the overlap of image regions of the captured source images.

The quality of a composite image is constrained by the imagery that is used in its creation. It should be appreciated that the resolution involved and the number of viewpoints that are considered are important factors that impact the creation of composite images. The greater the resolution and number of viewpoints provided the greater the spatial resolution of the resultant composite image. While digital still cameras are reaching mega-pixel dimensions at nominal cost (e.g., providing increasingly higher resolution images), the spatial resolution provided by digital video systems lags far behind that offered by digital still cameras.

Although multi-viewpoint camera systems have been in existence since the dawn of photography, most conventional image analysis is based upon single camera views. It should be appreciated, that although stereo and moving video cameras can provide more viewpoints, the actual utilization of simultaneous acquisition from a large number of perspectives remains rare as it relates to such imaging systems. A principal reason for the lower resolution and limited number of viewpoints that are conventionally employed in personal computer (PC) imaging systems is the high bandwidth necessary to support sustained data movement from numerous video sources. The data is provided to a computer memory and, eventually, to a display, at the conventional supply rate of 30 frames per second. Moreover, access to high-bandwidth multiple-stream video has been limited.

Bandwidth issues arise at the display end of conventional imaging systems as well. This is because moving large amounts of digital video severely taxes current PC architectures. Real-time display of these data requires a judicious mix across peripheral component interconnect (PCI), PCI-X, and accelerated graphics port (AGP) buses distributed over multiple display cards.

The creation of composite images (e.g., mosaicking) involves combining source images captured from a plurality of camera viewpoints. The source images are derived from viewpoint associated video streams and are used to form the composite image. A conventional approach to the creation of composite images involves finding points that correspond in the contributing images and computing stitching homographies that relate their perspectives. This approach derives from the situation where images are collected from arbitrary positions, such as in hand held capture. There, the features for deriving each homography must come from the acquired images themselves. If the camera views share a center of projection, the features can be chosen from anywhere in the overlapping images and their homographies will be valid throughout the scene viewed. However, when they don't share a projection center, the features must be collected from a shared observation plane and the homography may only produce seamless composite images for imagery in that plane.

For the reasons outlined above, conventional systems that composite images are relegated to low-resolution implementations that employ a limited number of viewpoints. The limited number of viewpoints provides a limited capacity to produce panoramas from acquired images that have high spatial resolution. The performance of conventional systems is further limited by their reliance on the use of overlapping image data to generate homographies. The requirement that the source images used to compose a composite image overlap decreases the size of the view angle that can be imaged as it prevents the imaging of non-overlapping views that can cover a wider measure of space.

DISCLOSURE OF THE INVENTION

A method and system for producing seamless composite images having non-uniform resolution from a multi-imager system is disclosed. A plurality of lower resolution source images is acquired. In addition, a plurality of higher resolution source images is acquired. The plurality of the lower resolution images and the higher resolution images are then layered to produce a composite image, wherein the layering of the plurality of the lower resolution images and the higher resolution images to produce a composite image having a plurality of resolutions therein.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

FIG. 5 is a flowchart of an exemplary method for producing seamless composite images having non-uniform resolution from a multi-imager system in accordance with one embodiment of the present invention.

BEST MODE FOR CARRYING OUT THE INVENTION

Figure 1:
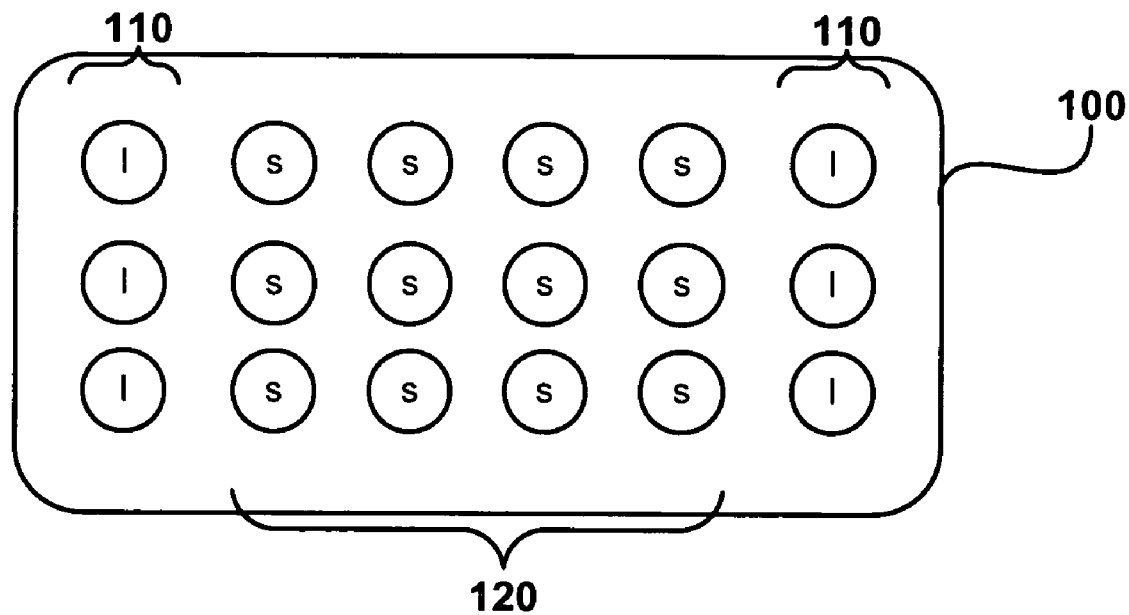
FIG. 1 is a diagram of an exemplary camera system having a plurality of cameras with a plurality of focal lengths according to one embodiment of the present invention.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, objects, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments described herein provide an automated method and system for producing seamless composite images having non-uniform resolution from a multi-imager system. As an example, embodiments described herein could provide a lower resolution overview of an entire scene while also providing higher resolution areas "hot spots." Although two resolutions (e.g., lower and higher) are described herein, any number of resolutions may be used within the imaging system. The use of two resolutions herein is merely for purposes of brevity and clarity.

In general, resolution can be changed through either employing an imager with a different number of pixels or using lenses of differing focal lengths. For example, a conference room may be completely viewed via the lower resolution imagers. However, certain spots within the conference room, such as a drafting board, or a location on the conference table, will be covered by at least one higher resolution imager with a similar focal length or a similar resolution imager using a longer focal length lens. Therefore, when the video is navigated, the items that are placed in the hot spot locations on the conference table or items on the drafting board will be available for further evaluation. For example, a viewer could zoom in on the hot spot and actually read a paper or follow the drawing on a drafting board—details which would not be discernible at a lower, base resolution. In addition, ancillary interaction information may be made available in these higher resolution areas—information (termed digital objects) neither available nor seen when viewed at lower resolution. These objects are presented at a resolution where their content or token is discernible. They may take the form of a link to hypertext or other descriptive or interactive forms, providing imagery interaction options tailored to the multi-resolution aspect of the imaging system. User actions on these objects—such as mouse selections, hand gestures, or similar means of expressing an intent—will activate them.

In addition to providing hot spots, embodiments described herein also provide navigation within the image. That is, when a user zooms in on a location such as a hot spot or other higher or lower resolution portions of the image, the actual scene being recorded does not change. Instead, the entire scene is recorded and the user navigates within the recorded image. In so doing, the entire recorded scene is capable of being viewed by a plurality of users without one user's area of interest adversely affecting other users. In addition, the same user could view the same scene in a plurality of ways, each focusing on the same or different events within the scene.

Furthermore, because of the ability to initially select the hot spots during the imager installation process, embodiments described herein are well suited for use in security environments. For example, the lower resolution scene could cover a large area while known gathering areas, or choke points, could be selected as hot spots. In so doing, the resulting video would provide overall security as well as the ability to zoom in and provide higher resolution imagery of important objects or events as they transition these areas.

Thus, by using the present embodiments described herein, a large area can be imaged with a plurality of lower and higher resolution imagers resulting in an overall image that contains a plurality of resolutions while reducing the overall number of pixels required for higher resolution imagery. In addition, the number of bits necessary for capturing and ultimately transmitting an overall scene is significantly reduced since the scene is captured in a lower resolution and only designated hot spots are captured in higher resolution.

With reference now to FIG. 1, a camera system 100 with longer focal length imagers 110 and shorter focal length imagers 120 that produces seamless non-uniform resolution composite images is shown in accordance with one embodiment of the present invention. Moreover, in one embodiment, the camera system 100 produces the seamless non-uniform resolution composite images without requiring overlap of the source images that constitute each composite image. In the present embodiment, a plurality of lower resolution composite images are formed by combining a plurality of lower resolution source images that are captured using a plurality of imagers according to one embodiment of the present invention. In addition, in one embodiment, a plurality of higher resolution composite images are formed by combining a plurality of higher resolution source images that are captured using at least one higher resolution imager such as longer focal length imagers 110 according to one embodiment of the present invention.

Although camera system 100 includes a number of shorter focal length imagers 120 and longer focal length imagers 110, longer focal length imagers 110 may use more or fewer imagers for each resolution. Moreover, although two different resolution imagers (e.g., 110 and 120) are shown in FIG. 1, any number of different resolution imagers (including imagers of different focal length) may be utilized. For example, camera system 100 may include 3, 7, or other number of different resolution imagers having different focal lengths. The use of two differing resolution imagers is shown herein merely for purposes of brevity and clarity. In addition, although the shorter focal length imagers 120 are shown on the inside and the longer focal length imagers 110 are shown on the outside, they may be arranged in any different order. The setup provided in FIG. 1 is merely for purposes of brevity and clarity.

In general, imagers 110 and 120 capture respective source images from the respective viewpoints of the imagers 110 and 120. The captured source images are combined, in one embodiment based on their resolution, to form seamless composite images (e.g., virtual images, mosaic images etc.). The composite images are created using source images that correspond to respective image streams that are generated by the respective imagers 110 and 120. For example, a lower resolution composite image may be created using shorter focal length imagers 120 having lower resolution associated therewith. Similarly, a higher resolution composite image may be created using longer focal length imagers 110 having higher resolution associated therewith.

While one embodiment of camera system 100 may have a common plane arranged fronto-parallel to the camera views, in which case the individual lenses of the imagers will all be focused at about the same distance. It should be appreciated that the focal distances of the lenses of imagers 110 and 120 may be set independently to accommodate an orientation of a common plane that is not orthogonal to their general view direction.

In exemplary embodiments, the relationship of captured (e.g., acquired) images can be fixed before capture. When the relationship of captured images is fixed before capture, dynamic registration can be replaced by once only analysis. In one embodiment, longer focal length imagers 110 and shorter focal length imagers 120 are configured beforehand for a desired panorama-shaped image, and the known relationship of the imagers 110 and 120 is used to repeatedly compose the frame in real time at minimal central processing unit (CPU) cost. Further discussion of image composition is provided herein.

Figure 2:
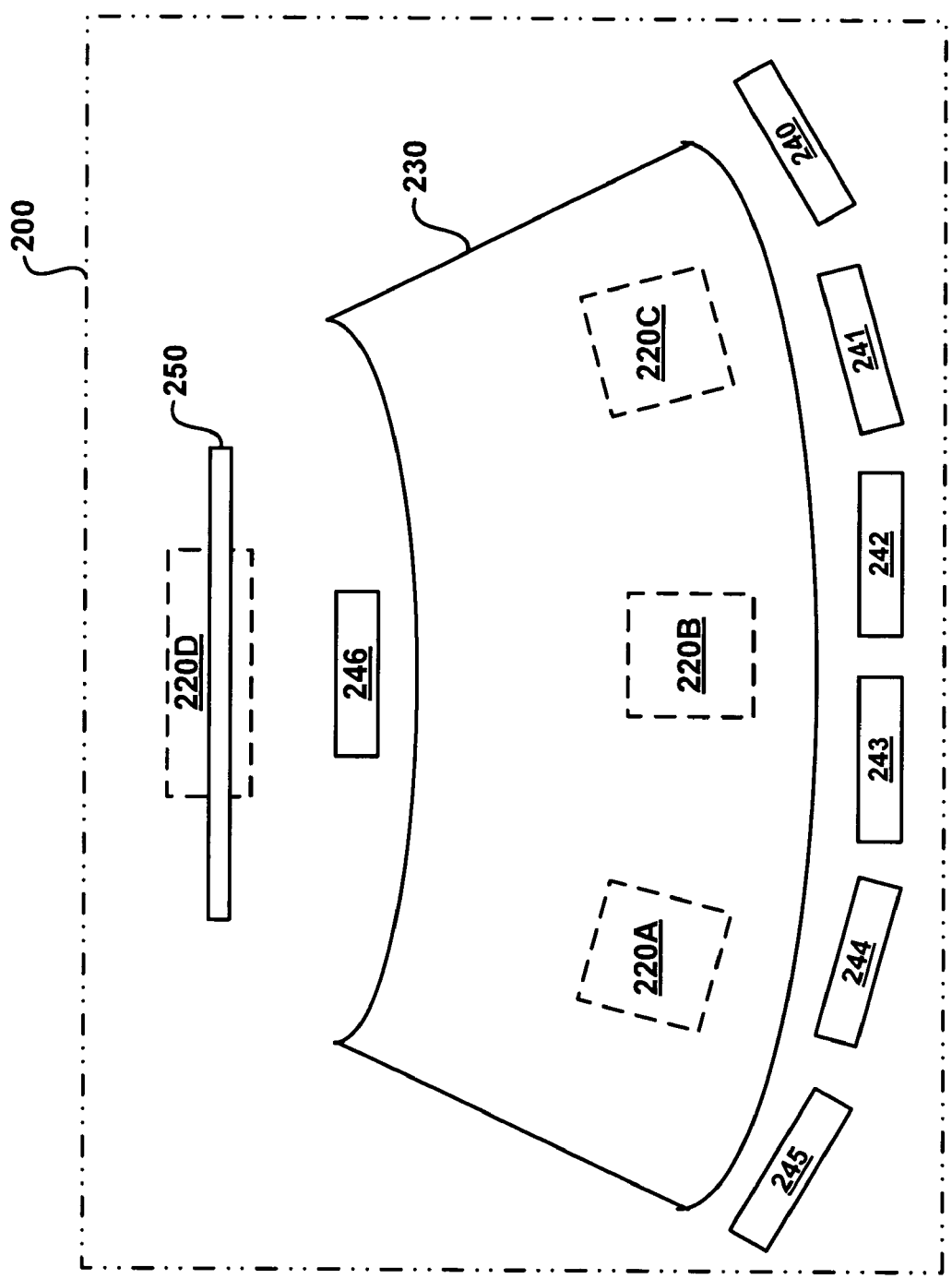
FIG. 2 is a diagram of an exemplary conference room being recorded by the exemplary camera system in accordance with one embodiment of the present invention.

For example, in operation, camera system 100 can be situated so that objects that are desired to be imaged are located within its imaging plane, e.g., plane of focus POF, shared or common observation plane, etc., (see discussion made with reference to FIG. 2). In one embodiment, a plurality of imagers is configured to capture respective source images from respective portions of the shared observation plane. In the present embodiment, seamless composite images are formed by combining the source images using a re-sampling mechanism that utilizes homographies based on line features.

It should be appreciated that the size of the view angle that can be imaged by camera system 100 is significantly increased as compared to conventional systems because it does not rely on image overlap to produce composite images. The larger view angle allows the imaging of panoramas that cover a wider measure of space. For this reason a plurality of lower resolution imagers can be used to produce panoramas that have increased spatial resolution for the number of imagers that are provided. Consequently, greater spatial resolution can be achieved with less additional bandwidth.

In one embodiment, the line features that are used can be visible in and extend across several images and can provide correspondences between the images that eliminates the necessity of having significant overlapping of the source images from which a composite image is formed (see discussions made herein).

For example, because the presence of overlap can be limited to operations that ensure the continuity of the composite image, the presence of overlap can be minimized or eliminated. Moreover, because a series of source images that do not overlap can cover a wider angle than the same number of similarly formatted source images that do overlap, the number of imagers that are necessary to cover space desired to be imaged can be reduced. This feature of exemplary embodiments of the present invention minimizes the number of imagers that is required to construct a desired panoramic view. It should be appreciated that this maximizes both the usefulness of acquired pixels and the efficiency of the image processing (capacity to image a wider angle using fewer imagers).

In one embodiment, the creation of seamless composite images (e.g., video mosaicking) can be employed to capture panoramic views (e.g., wide angled and unbroken lower resolution views) of video conferencing participants as well as hot spot focused views (e.g., longer focal length and higher resolution views) for presentation at remote sites. In such embodiments the observations from several lower resolution multi-viewpoint imagers are combined to simulate the performance of a much costlier mega-pixel video camera. At the same time, the observations from several higher resolution multi-viewpoint imagers are combined to provide significant imagery details. The result can be reformatted to a desired panoramic view shape.

Referring now to FIG. 2, a diagram of an exemplary conference room 200 being recorded by the exemplary camera system 100 is shown in accordance with one embodiment of the present invention. In general, exemplary conference room 200 includes a conference table 230, chairs 240-246 and display board 250. As will be described in detail herein, shorter focal length imagers 120 are used to capture the entire portion of the conference room 200. Although the captured image is described herein as a conference room 200, embodiments described herein are well suited for use in other locations such as bus stations, doorways, stores, offices, and almost any other recordable area. The use of a conference room 200 herein is merely for purposes of brevity and clarity. Moreover, the size and shape of the area captured by the imagers is also user definable and may be of regular or irregular shape.

Exemplary conference room 200 also includes areas of interest 220A-220D. As will be described herein, longer focal length imagers 110 are used to capture the areas of interest 220A-220D. Additionally, in one embodiment, the areas of interest 220A-220D are also captured by the shorter focal length imagers 120. However, in another embodiment, any or all of each or a portion of each of the areas of interest 220A-220D may not be captured by the shorter focal length imagers 120. In other words, although in one embodiment, the longer focal length imagers 110 are directed into the same area of interest as the shorter focal length imagers 120 they may also be partially or completely directed into areas of interest not within the field of shorter focal length imagers 120.

Figure 3:
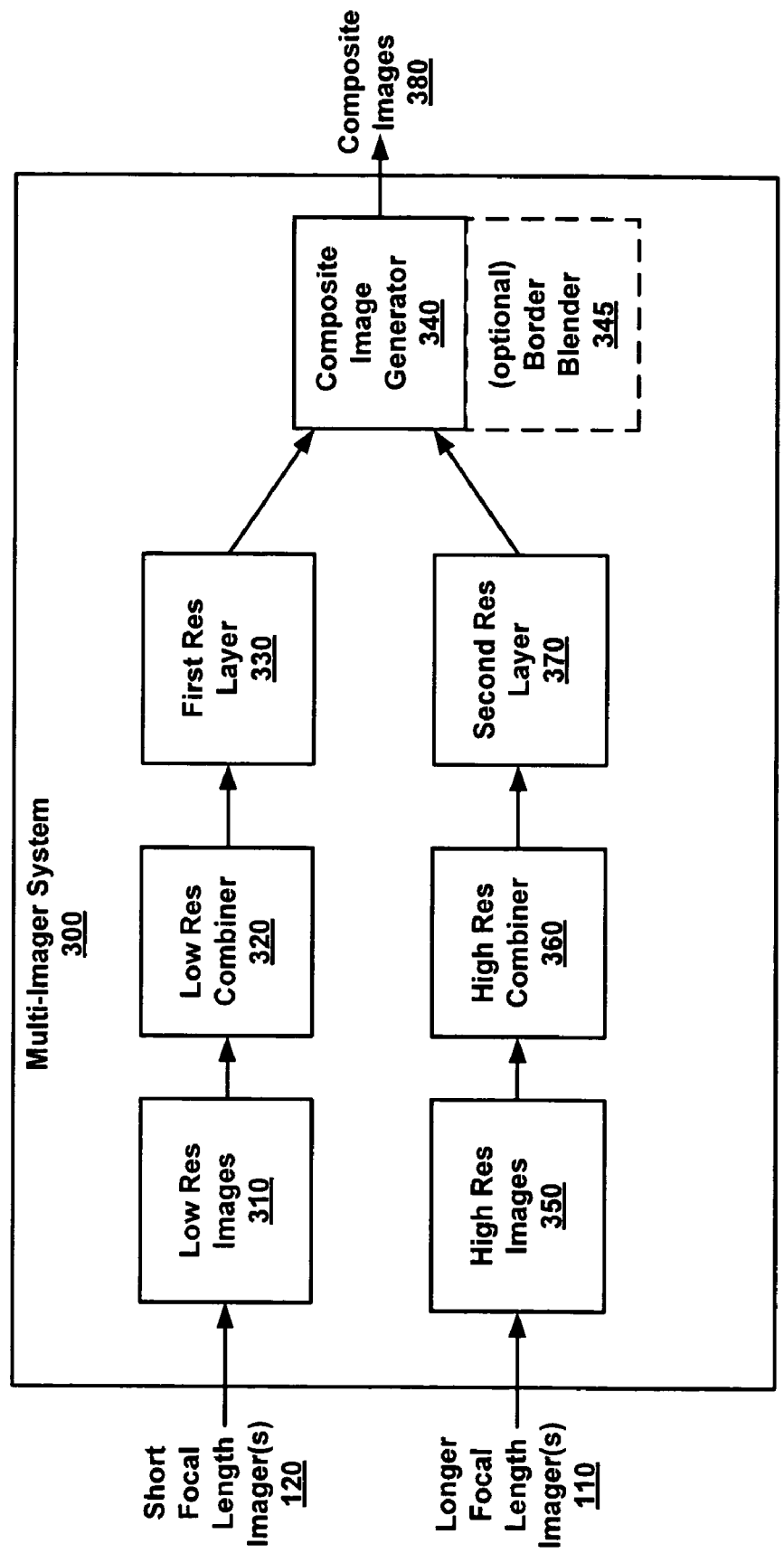
FIG. 3 is a block diagram of an exemplary multi-imager system in accordance with one embodiment of the present invention.

With reference now to FIG. 3, an exemplary multi-imager system 300 is shown in accordance with one embodiment of the present invention. In general, multi-imager system 300 includes a lower resolution chain including a lower resolution images receiver 310, a lower resolution images combiner 320 and a first resolution layer generator 330. The multi-imager system 300 also includes a higher resolution chain including a higher resolution images receiver 350, a higher resolution images combiner 360 and a second resolution layer generator 370. The multi-imager system 300 also includes a composite image generator 340. Multi-imager system 300 may also include the optional border blender 345.

In operation, the multi-imager system 300 receives images from shorter focal length imagers 120 and longer focal length imagers 110 and provides composite images 380 which include images with both lower resolution and higher resolution characteristics. Although only two resolution chains are described herein, embodiments of the present invention are well suited to a multi-imager system 300 which processes images with more than two distinct resolutions. The use of the two chain resolution system described herein is merely for purposes of brevity and clarity. Moreover, although the two resolution chains are shown separately within the multi-imager system 300, this is also for purposes of brevity and clarity. Embodiments herein are well suited to any or all of the components within multi-imager system 300 being performed by a single device or a plurality of devices. For example, the lower resolution combiner 320 and higher resolution combiner 360 may be performed by the same combiner.

The following description details only one chain of the two resolution chains. Although the two (or more) resolution chains are used in operation, the description of only a single resolution chain is provided merely for purposes of brevity and clarity.

In general, the lower resolution images receiver 310 receives the lower resolution images from the short focal length imagers 120. The lower resolution combiner 320 receives the lower resolution images from the lower resolution images receiver 310. lower resolution combiner 320 combines the source images that are acquired by shorter focal length imagers 120 to produce a seamless composite image (e.g., virtual image, mosaic image etc.). In one embodiment, the composite image is created in a manner that does not require overlap of an image region of the acquired image. In one embodiment, this is accomplished by using line features to combine the source images. The line features enable the lower resolution combiner 320 to identify relationships that exist among the source images that can be utilized to combine the source images seamlessly.

In one embodiment, once the combiner 320 produces a seamless composite image, the image becomes a layer based on the resolution. For example, lower resolution images become the first resolution layer 330 while higher resolution images become the second resolution layer 370. The layers are then passed to the composite image generator 340 which combines the layers, using a plurality of various methods described herein, to provide composite images 380. In one embodiment, composite image generator 340 utilizes the optional border blender 345 to select and blend the border elements between the layers.

For example, in one embodiment, the first resolution layer 330 is a lower resolution image of the entire conference room 200. While the second resolution layer 370 is a higher resolution area of interest such as 220B. Thus, in one embodiment, the borders of the area of interest 220B are selected and blended with the overall first resolution layer 330 to smooth the transition from the first (lower) resolution layer 330 to the second (higher) resolution layer 370.

Figure 4:
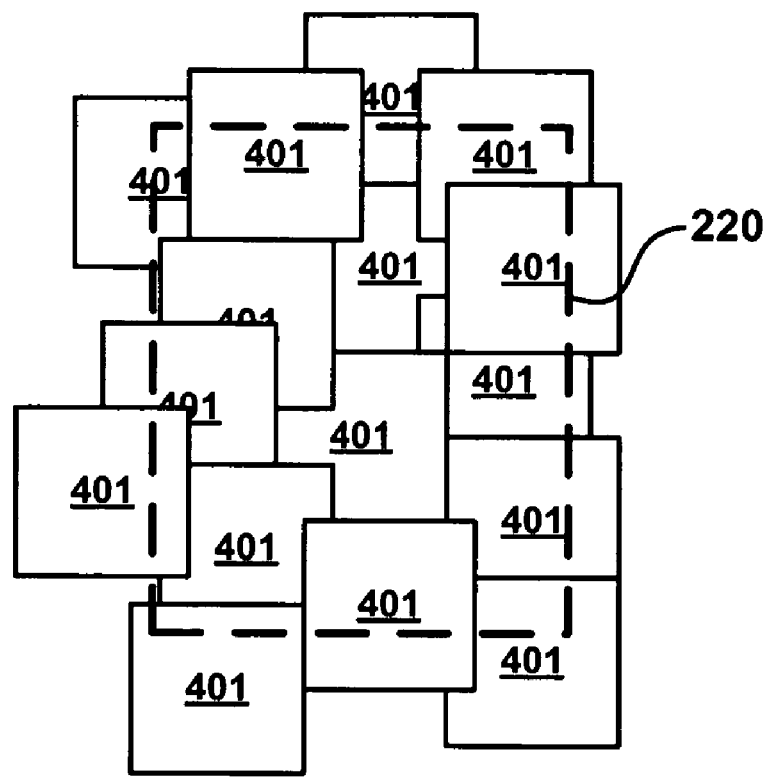
FIG. 4 is a block diagram of an exemplary seamless border image shaper in accordance with one embodiment of the present invention.

Referring now to FIG. 4, a block diagram of an exemplary seamless border image shaper 400 is shown in accordance with one embodiment of the present invention. In general, image shaper 400 provides an opportunity for a user to define the actual shape of the area being imaged. For example, image shaper 400 includes a plurality of images 401 which are to be combined to form a seamless image. However, if the images 401 are merely combined they will form an image that does not have a well defined shape. Instead, the image will be rough edged and misshapen.

In one embodiment, the misshapen image is the user preferred image, and as such, there will be no shaping of the combined seamless image. However, in another embodiment, the user may desire to define a shape 220 as the actual area to be imaged and will ignore the imagery outside of the shape 220. For example, this may be used to save pixels, reduce overall bandwidth or otherwise clean up an image layer. Although the shape 220 is shown as a rectangle, embodiments described herein are well suited to any shape 220 such as a standard shape, a non-standard shape, a geometric shape, or any other type of shape 220 that a user may desire.

Operation

With reference now to FIG. 5, a flowchart 500 of an exemplary method for producing seamless composite images having non-uniform resolution from a camera system is shown in accordance with one embodiment of the present invention. In conjunction with the method discussion, an example of a conference room 200 (of FIG. 2) meeting will be utilized to provide further detail. However, as stated herein, the conference room 200 example is merely one of a plurality of locations within which the camera system 100 may be deployed.

With reference now to 502 of FIG. 5 and to FIG. 2, one embodiment acquires a plurality of lower resolution source images. For example, the plurality of lower resolution source images is acquired from a plurality of shorter focal length imagers 120 in the camera system 100 wherein the plurality of shorter focal length imagers 120 are a part of a pan tilt zoom (PTZ) imaging system that provides frame selection within the composite image.

For example, the plurality of lower resolution source images may be images taken of a conference room 200. Included in the lower resolution images may be the desk 230, the chairs 240-246 the display board 250 and any persons or information within the imaged area.

Referring now to 504 of FIG. 5 and to FIG. 2, one embodiment blends the lower resolution images to form a first resolution layer of an overall scene. For example, the first resolution layer of an overall scene may be the conference room scene 200. In general, the first resolution layer of the scene may be of high enough quality to provide a scene overview and provide clear identification of the room, the number of people therein, and the like, but may not necessarily provide the ability to read documents on the table 230, display board 250, recognize a persons eye color, or the like.

One embodiment utilizes a lower resolution combiner 320 of FIG. 3 for blending the plurality of the lower resolution source images to form the first resolution layer 330. In one embodiment, the lower resolution combiner 320 combines the plurality of source images to produce a seamless composite image without requiring overlap of image regions of the plurality of source images. In one embodiment, the blending of the plurality of the lower resolution images is also shaped into a previously defined shape such as shape 220 of FIG. 4, the conference room table 230, or the like. In yet another embodiment, the shaping can occur post production. That is, the images are initially recorded and then the video can be edited to provide crisp edges for one or more layers.

With reference now to 506 of FIG. 5 and to FIG. 2, one embodiment acquires a plurality of higher resolution source images. In general, the plurality of higher resolution source images is acquired from at least one longer focal length imager 110 in the camera system 100 wherein the longer focal length imager is a part of a pan tilt zoom (PTZ) imaging system that provides frame selection within the composite image.

In one embodiment, the plurality of higher resolution source images may be images taken of a specified area within conference room 200. For example, included in the higher resolution images may be the areas of interest 220A-220C on the conference table 230, area of interest 220D on the display board 250 or any other location within the imaged area.

Referring now to 508 of FIG. 5 and to FIG. 2, one embodiment blends the higher resolution images to form a second resolution layer of a portion of the overall scene. In one embodiment, the second resolution layer of a portion of the overall scene may be the areas of interest 220A-220D. In general, the second resolution layer of the scene may be of high enough quality to provide the ability to read documents on the table 230, display board 250, recognize a person's eye color, or the like.

For example, in the conference room 200, the areas of higher resolution are known and may even be marked on the conference room table 230 or display screen 250. Thus, during a meeting, if a meeting attendee provides writing, images, and the like within the defined areas of interest 220A-220D, the writing, images and the like will be recorded in high enough resolution for a later viewer to read, view, or otherwise interact with the attendees media.

However, in another embodiment, such as the security environment, the areas of interest 220A-220D may not be overtly defined. In other words, the areas of interest 220A-220D will not be marked on the table, drawn on the wall, or otherwise provided to a scene attendee. In so doing, the area of interest will provide further detail about the attendee, such as eye color, detailed face imagery, and the like, which would be unknown to the attendee. In yet another embodiment, the areas of interest 220A-220D may be well signed in a security environment to provide an amount of deterrence. That is, since an attendee will be informed that their image has been recorded in higher resolution, the attendee may be less willing to perform in a notorious manner.

One embodiment utilizes a higher resolution combiner 360 for blending the plurality of the higher resolution source images to form the second resolution layer 370. In one embodiment, the higher resolution combiner 360 combines the plurality of source images to produce a seamless composite image without requiring overlap of image regions of the plurality of source images. In one embodiment, the blending of the higher resolution images is also shaped into a previously defined shape such as shape 220 of FIG. 4.

With reference now to 510 of FIG. 5, one embodiment layers the plurality of the lower resolution images and the higher resolution images to produce at least one composite image having non-uniform resolution. In other words, in one embodiment, at each level, the set of images is blended together using methods such as mosaic and the like. However, each level is not necessarily blended into the previous level.

For example, when a user views the first layer of imagery a broad overview of the conference room 200 of FIG. 2 is provided. That is, because the imagery is the lowest recorded resolution and probably imaged by the shortest focal length imagers 120 the lower resolution layer will probably provide the largest scene with the least amount of detail.

As the user zooms in on an image like the conference room table 230, the user may transition to the second layer, a layer of higher resolution. In one embodiment, the layer of higher resolution from longer focal length imagers 110 is usually of a smaller scene but in greater detail than that of the previous layer. As the user zooms in even closer, such as, into a hot spot like 220B, the user may transition to yet another layer of the composite image. At the hot spot 220B layer, an even higher resolution layer of an even smaller scene imaged from an even longer focal length imager is provided. Thus, in one embodiment, the composite image that initially appears as an image of an overall conference room 200 is actually a layered image having any number of levels and resolutions which may include significant portions of detail.

Moreover, due to the layering of the image and the digital navigation therein, it is also possible to imbed objects within the layers. For example, when the user zooms all the way in on a hot spot and views an image such as a cover page of a document, embodiments described herein are capable of providing links within the image. For example, the cover page layer may include user selectable links that open the actual document in an electronic format. Additionally, the link could provide a print option, a save option, and the like. Thus, due to the layering technology, the composite imagery is capable of receiving and incorporating outside data structures and links within the image.

In yet another embodiment, the plurality of lower resolution images may be acquired in color when forming the first resolution layer. In addition, the plurality of higher resolution images may be acquired in monochrome, e.g., black and white, forming an additional resolution layer. Such that the color from the first resolution layer is blended with the monochrome of the additional resolution layer to obtain higher resolution color images at a reduced bandwidth. That is, since the higher resolution layer is in black and white, less information is needed per pixel. However, by combining the color information from the lower resolution image with the higher resolution black and white image, a higher resolution color image can be realized at significant information savings, and in a manner that exploits the variations in sensitivity of human vision between luminance and chrominance.

In one embodiment, at least one edge portion of the second resolution layer 370 may be blended with a portion of the first resolution layer 330 to smooth the transition from the first layer 330 to the second layer 370. Moreover, the edge portion blending may occur without requiring blending of any other portions of the second resolution layer 370 with the portion of the first resolution layer 330. For example, 5 pixels of the second resolution layer 370 border may be blended with the first resolution layer 330 to smooth the transitional section. Although 5 pixels are described herein, the border smoothing may be more or fewer than 5 pixels. The use of 5 pixels herein is merely for purposes of brevity and clarity.

Additional blending between layers may also be provided to ensure color transition or other non-uniform image issues that may result from disparity between the pluralities of imagers such as, but not limited to, lighting, shadows, angle, resolution, focal length, etc.

The Use of Line Features

Figure 6:
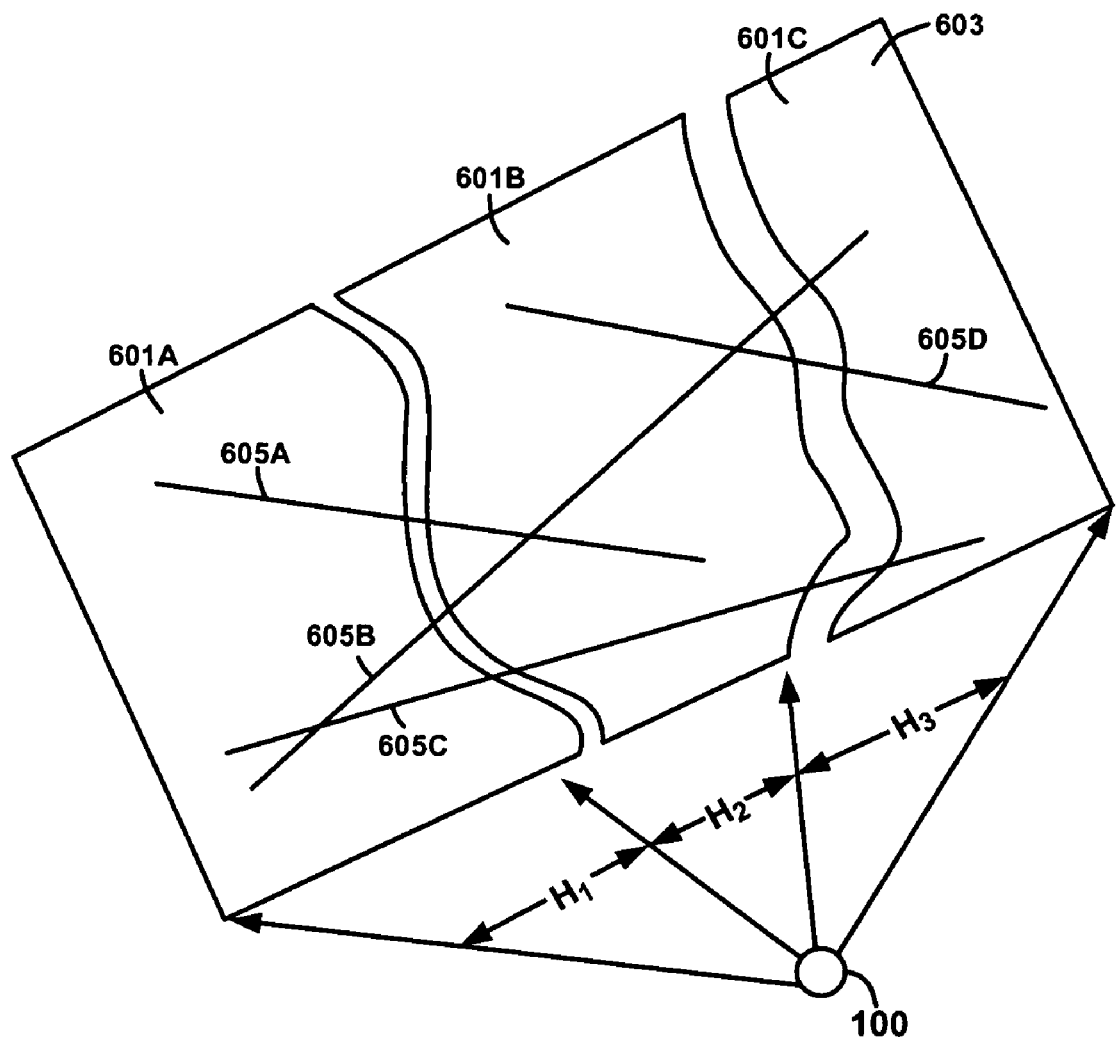
FIG. 6 shows source images captured by a multi-imager camera system and line features that are used to relate the source images according to one embodiment of the present invention.

FIG. 6 shows source images captured by a multi-imager camera system and line features that are used to relate the source images according to one embodiment of the present invention. FIG. 6 shows source images 601A-601C, calibration plane 603 and line features 605A-605D. FIG. 6 illustrates the use of line features 605A-605D which are projected into calibration plane 603 and used to identify relationships between source images 601A-601C. The relationships are used to generate a respective homography H1, H2 and H3 for respective source images 601A-601C.

It will be obvious to those skilled in the art that there is a certain number of such lines that must be observed and certain relations of independence that must be satisfied in order for the homography estimation process to be valid.

In exemplary embodiments, using line features 605A-605D, high-resolution wide-angled panorama views can be constructed from a minimum number of low-resolution imagers (e.g., 110, 120 in FIG. 1). In such embodiments, an homography H relating two source images I and I' (for instance 601A and 601B) with corresponding points x and x' and lines 1 and 1' is given by the equations:

$$x'=Hx$$

$$1'=H^{-t}1$$

Referring again to FIG. 6, since in one embodiment lines (e.g., line features 605A-605D) can be employed that are visible in and extend across several source images (e.g., 601A-601C), correspondences among source images 601A-601C can be identified without significant source image overlap. Since overlap is only needed for continuity of the resulting composite image, the need for overlap can be minimized (to zero) and the number of imagers (e.g., 110, 120 in FIG. 1) needed to construct a desired panoramic view is reduced. In such embodiments, the usefulness of acquired pixels is maximized while processing is made more efficient.

It should be appreciated that the size of the view angle that can be imaged by a camera system (e.g., 100 in FIG. 1) employing the above described line feature image compositing methodology is significantly increased as compared to conventional systems because image overlap is not required in order to produce seamless composite images. The larger view angle allows the imaging of panoramas that cover a wider measure of space. For this reason, by employing the herein described methodology, a plurality of lower resolution imagers can be used to produce panoramas that have increased spatial resolution for the number of imagers that are provided. Consequently, greater spatial resolution can be achieved with less additional bandwidth.

It should be appreciated that lines are similar to points in that collinear lines are like lines of coincident points, parallel lines are like lines of collinear points, and a minimum of four observations in general position are needed to form an homography with eight degrees of freedom (in a preferred embodiment, many more can be used in order to improve precision and stability). However, the extended spatial support of line based solutions presents an added advantage over point-based solutions in that localization of a line is more robust. More specifically, when presented with the same number of observations of lines and points, better estimates can be generated using the lines, and their use enables preservation of straightness over the full composite.

Line Based Homographies

Figure 7A:
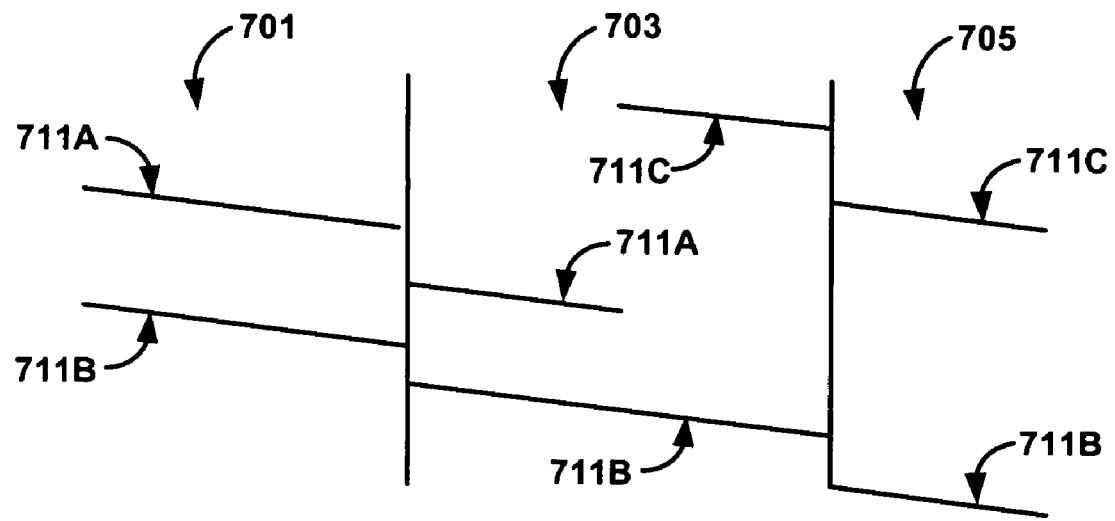
FIG. 7A illustrates the formation of a seamless composite image using line based homographies according to one embodiment of the present invention.
Figure 7B:
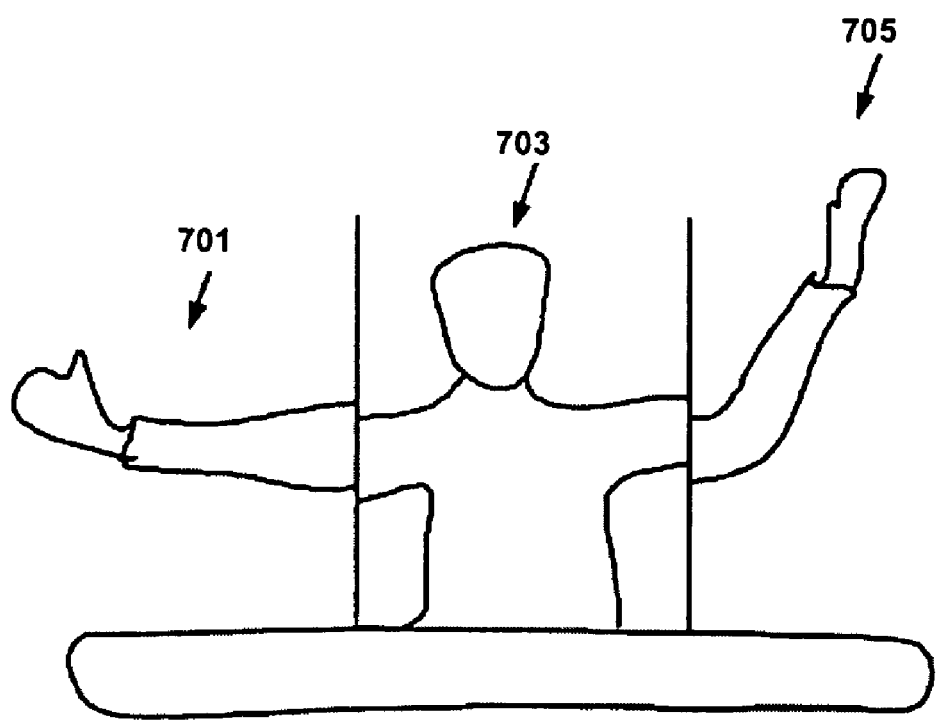
FIG. 7B illustrates the formation of a seamless composite image using line based homographies according to one embodiment of the present invention.
Figure 7C:
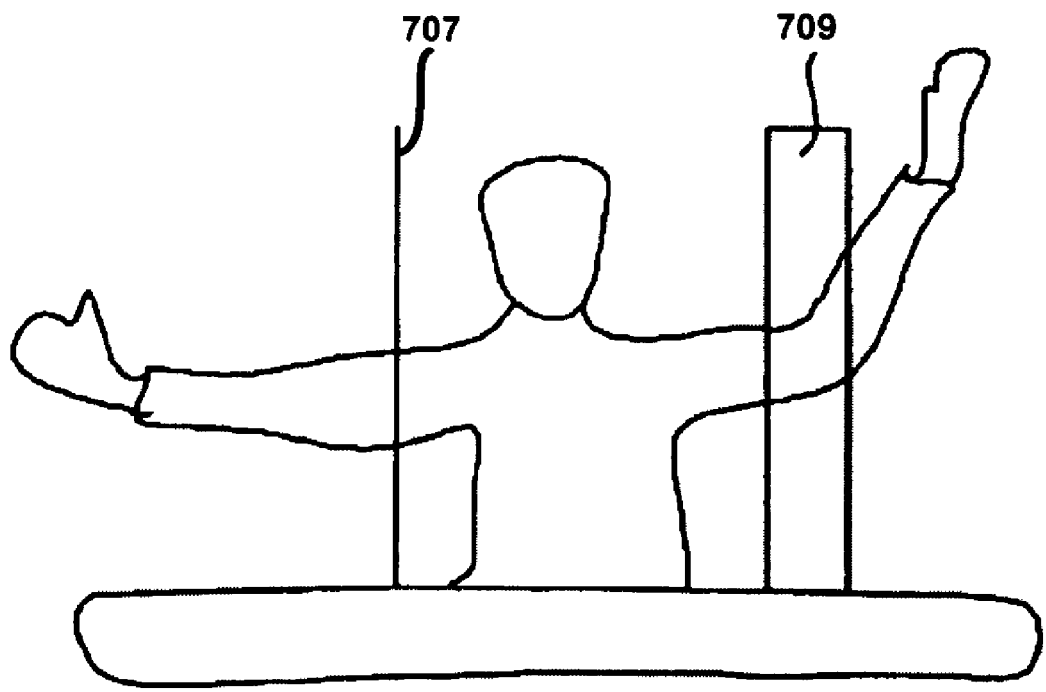
FIG. 7C illustrates the formation of a seamless composite image using line based homographies according to one embodiment of the present invention.
Figure 7D:
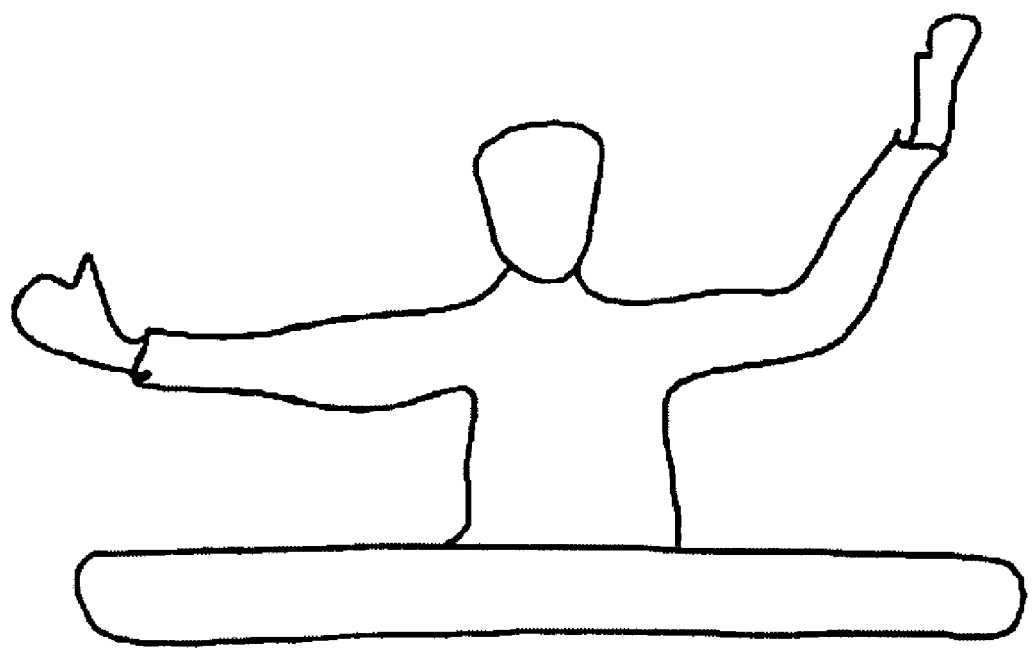
FIG. 7D illustrates the formation of a seamless composite image using line based homographies according to one embodiment of the present invention.

FIGS. 7A-7D illustrate the formation of a seamless composite image, such as first resolution layer 330 and second resolution layer 370 using line based homographies according to one embodiment of the present invention. FIG. 7B shows source images 701, 703 and 705 that contribute to the desired seamless composite image (e.g., mosaic) shown in FIG. 7D and the line features 711 (shown in FIG. 7A as line features 711A-711C) that relate the perspectives of source images 701, 703 and 705 from which homographies of source images 701, 703 and 705 are computed. FIG. 7C shows a view of the composite image without blending (unblended regions 707 and 709 are shown in FIG. 7B).

In one embodiment, homographies can be generated by: (1) projecting line features that are detectable by an imager array (see discussion made with reference to FIG. 6), (2) correcting the line features for lens distortion, (3) estimating line features using a least squares fitter, and (4) passing the line features to a homography solver. The homography from one imager (e.g., 110, 120 in FIG. 1) to another can be derived as the transpose inverse of the solution determined by treating the homogeneous representation of each line as if it were a point and solving for the point-wise homography (see equation above). Alternately, the line based homography can be determined directly from the linear estimates.

It should be appreciated that in one embodiment lens correction and luminance and color adjustments are made to bring images into agreement on color and, brightness, and to correct for lens distortions. In such embodiments the geometric correction is part of the re-sampling, and the color and brightness corrections make the content photometrically more correct.

In one embodiment, having the homographies that relate one imager to another allows the homographies to be chained together to determine the transforms that bring any involved imager into a global frame of reference. Initially, the global frame may be chosen as one of the imager frames (for instance the center imager). Subsequently, a derived global frame may be constructed that encompasses them all.

In one embodiment, a re-sampling mechanism (e.g., lookup table etc.) that contains pre-computed values that are used to compose a composite image from its contributing components is constructed after an output size within the dataset corresponding to a constructed frame is determined. The table can carry bilinear interpolation indices and weights that are used to compose each destination pixel. These indices map pixels that make up the resultant composite image through each imager homography and reposition the mapped point to account for any observed lens-induced curvatures. In one embodiment, the vast majority of pixels can be seen by only one imager. In cases where several imagers see a pixel, the contributions of the pixels can be blended. In one embodiment, the metric employed is linear interpolation (regions of overlap are determined, and the pixel weights of the contributing pixels seen by respective imagers are computed by distance from that source image's boundary).

CPU Based Production of Seamless Composite Images

Figure 8:
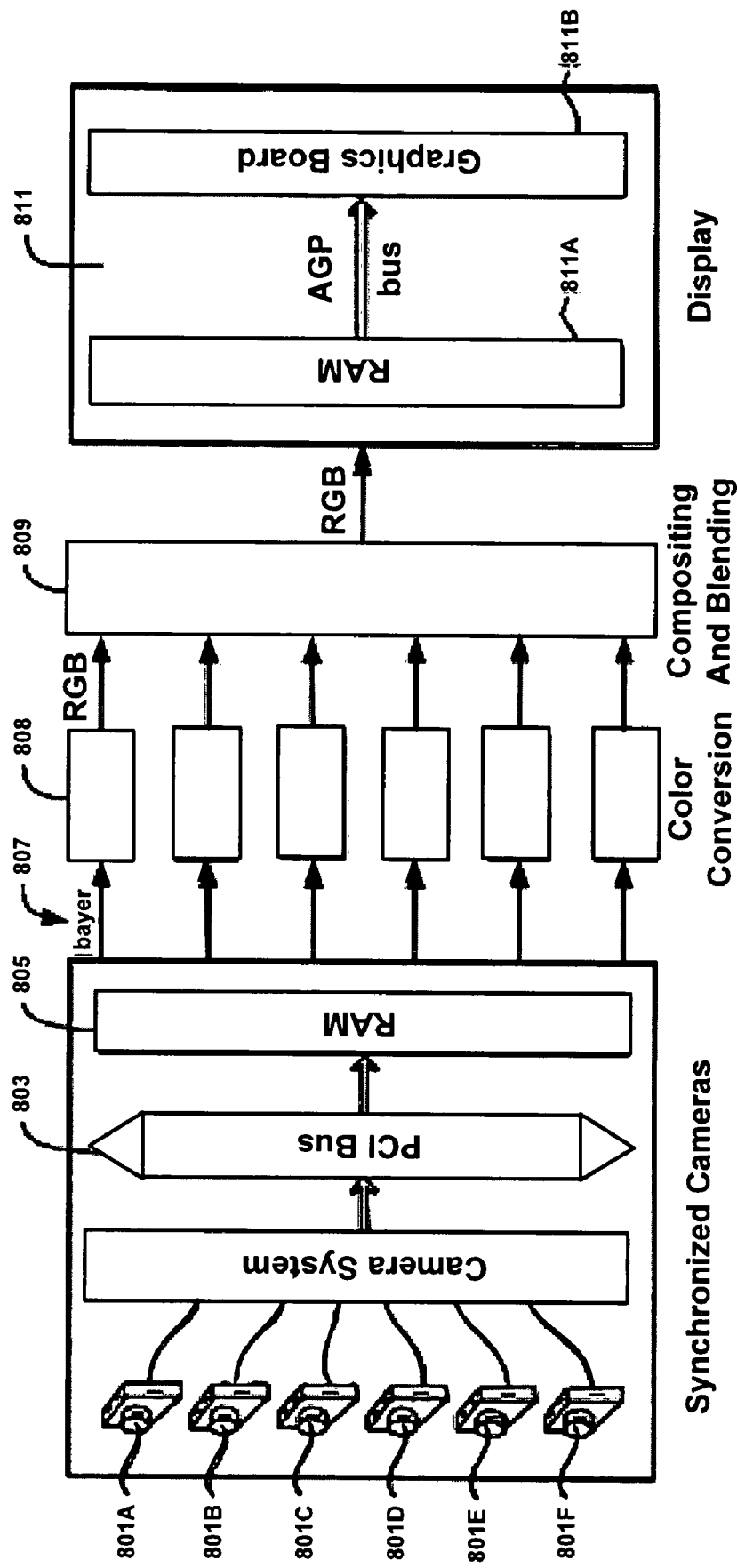
FIG. 8 shows an exemplary dataflow diagram illustrating the flow of video data where six video imagers are employed in a multi-imager camera system that employs central processing unit (CPU) processing according to one embodiment of the present invention.

FIG. 8 shows an exemplary dataflow diagram illustrating the flow of video data where six video imagers are employed in a multi-imager camera system that employs CPU processing according to one embodiment of the present invention. FIG. 8 illustrates a beneficial bandwidth and computation distribution scheme where parallelized CPU processing is employed. In the FIG. 8 embodiment, synchronized imagers 801A-801F generate parallel streams of video data that are delivered to RAM storage units 805 via a bus 803 (e.g., PCI etc.). Subsequently, the digital video 807 receives parallelized color conversion 808 and compositing and blending (if necessary) 809 and is delivered to a display 811 that includes RAM storage units 811A and graphics board 811B.

In moving large amounts of digital video 807 current PC architectures are severely taxed. Real-time display of these data requires a judicious mix across peripheral component interconnect (PCI), PCI-X, accelerated graphics port (AGP), and other such buses distributed over multiple display cards, which present significant bandwidth challenges. In one embodiment, with these bandwidth issues in mind, a distributed parallelized processing scheme such as is illustrated in FIG. 8 can be employed that is enabled both by the multi-imager system performance exhibited by exemplary embodiments of the present invention and by the advanced graphics processing units (GPUs) that are available for modern PCs (see discussion below).

In one embodiment, the compositing of images can be performed by a PC processor that uses a re-sampling mechanism (e.g., lookup-table etc). As discussed above, computation can be parallelized to exploit multiple processors. In this embodiment, re-mapping can be designed to scale based on numbers of camera pixels and size of display.

GPU Based Production of Seamless Composite Images

Figure 9:
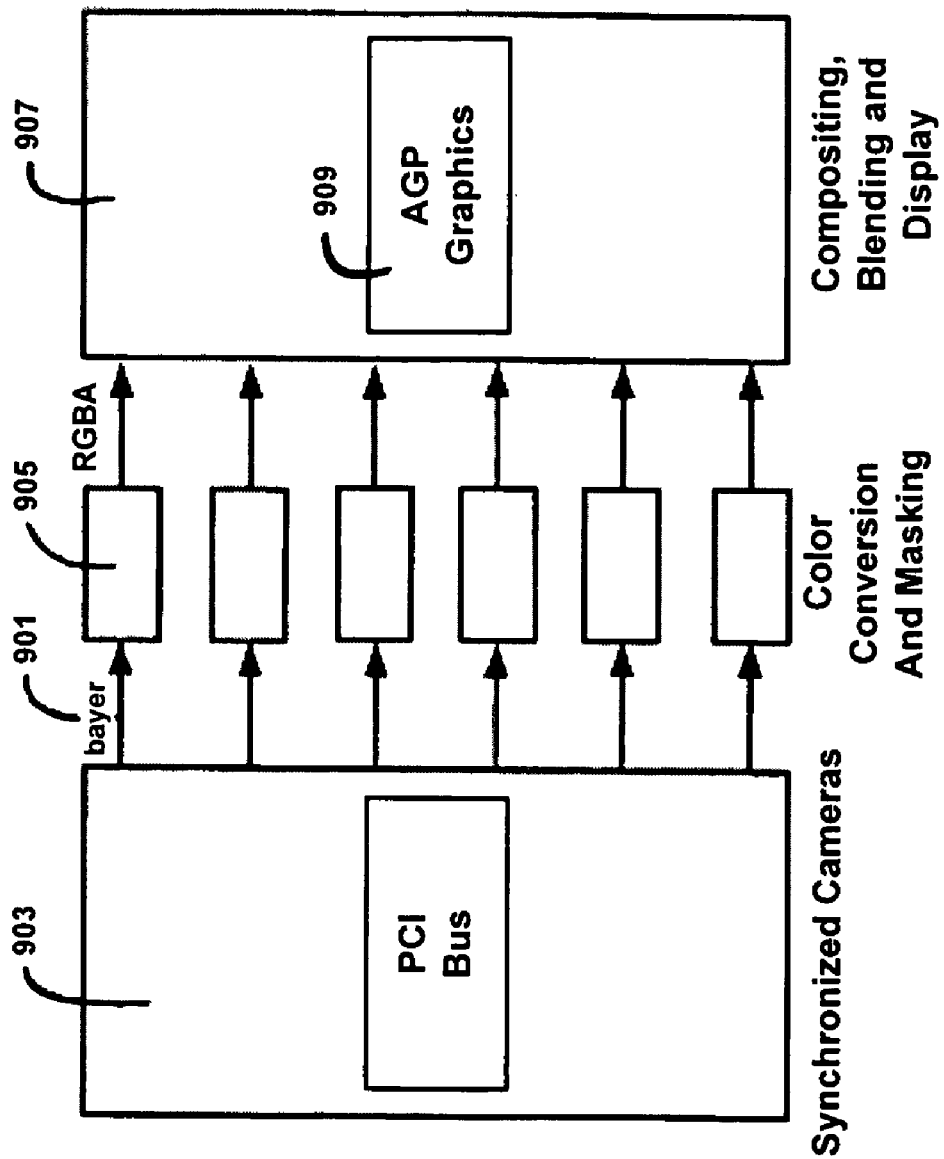
FIG. 9 illustrates an application of graphics acceleration according to one embodiment of the present invention.

FIG. 9 illustrates an application of graphics acceleration according to one embodiment of the present invention. FIG. 9 shows blocks that represent the video streams 901 that are generated by synchronized imagers, a data bus 903, color conversion operations 905, compositing/blending operations 907 and AGP graphics hardware 909. FIG. 9 illustrates an embodiment where compositing and blending operations 905 (e.g., mosaicking operations) are performed by the AGP graphics hardware 909 and preceded by CPU color conversion operations 905.

In the FIG. 9 embodiment, the use of graphics processing can be exploited for use in panorama building. In this embodiment, for display oriented tasks, re-sampling vectors can be treated as static image geometry and the streaming video can be treated as dynamic textures. In such embodiments, the static image geometry can be downloaded (reshaping the source images), allowing compositing and blending operations to be performed by the AGP graphics hardware 909 (e.g., GPU hardware). The subsequent video is streamed to the display.

In the FIG. 9 embodiment, GPU "mosaicking" can be performed considerably faster than CPU "mosaicking." In such embodiments, the CPU's task can be solely one of color converting the camera video from one format to another, and then passing the imagery to the graphics card. In another embodiment the processor load can be reduced even further by performing color re-sampling in the GPU rather than converting video into RGB before sending it to the graphics board. In this embodiment, bus bandwidth load can also be reduced which is an important consideration when cameras and displays share resources with other activities.

Another advantage of the GPU approach to "mosaicking" is that the cost of producing the composite image is independent of its size. By contrast, high costs are incurred for large images when CPU-based compositing is employed. In one embodiment, if the video stream is sent to a handheld device or ramped up for a very large display surface, the different scalings can be handled transparently in the graphics card.

In one embodiment, the graphics processing units (GPUs) of a PC can be used for the re-sampling to provide better scaling. In this embodiment, a beneficial computational use of available graphics processing is made. It should be appreciated that the use of graphics processing can be useful in display oriented applications.

Thus, embodiments of the present invention provide an automated method and system for producing seamless composite images having non-uniform resolution from a multi-imager system. Embodiments further provide seamless composite images having non-uniform resolution that is software navigable. Embodiments also provide a video that may be viewed a plurality of ways and allowing a user to focus on different areas each way the video is viewed. Moreover, because of the different resolution, the user is also provided higher resolution imagery that will allow a user to read papers, view images, and otherwise view higher resolution areas within the overall image.

Embodiments of the present invention are thus described. While the present invention has been described in particular embodiments, it should be appreciated that the present invention should not be construed as limited by such embodiments, but rather construed according to the following claims.

We claim:

1. A computer implemented method for producing seamless composite images having non-uniform resolution from a multi-imager, comprising:
    acquiring a plurality of lower resolution source images;
    blending said lower resolution images to form a first resolution layer of an overall scene;
    acquiring a plurality of higher resolution source images;
    blending said higher resolution images to form a second resolution layer of a portion of said overall scene;
    embedding digital objects within said second resolution layer, wherein said digital objects are selectable to provide additional imagery interaction options; and
    layering said plurality of said lower resolution images and said higher resolution images to produce at least one composite image having non-uniform resolution.

2. The method of claim 1 further comprising:
    acquiring said plurality of lower resolution source images from a plurality of short focal length imagers in said multi-imager; and
    acquiring said plurality of higher resolution source images from at least one longer focal length imager in said multi-imager.

3. The method of claim 1 further comprising:
    utilizing a combiner for blending said plurality of said lower resolution source images; and
    utilizing said combiner for blending said plurality of higher resolution source images;
    wherein said combiner combines said plurality of source images to produce a seamless composite image without requiring overlap of image regions of said plurality of source images.

4. The method of claim 1 further comprising:
    blending at least one edge portion of said second resolution layer with a portion of said first resolution layer without requiring blending of other than the at least one edge portion of said second resolution layer with said portion of said first resolution layer.

5. The method of claim 1 further comprising:
    acquiring said plurality of lower resolution images in color;
    acquiring said plurality of higher resolution images in monochrome; and
    blending said color from said first resolution layer with said monochrome of said second resolution layer to obtain higher resolution color images at a reduced bandwidth.

6. The method of claim 1 wherein said plurality of imagers are a part of a pan tilt zoom (PTZ) imaging system that provides frame selection within said composite image.

7. A multi-imager system for producing seamless composite images having non-uniform resolution, comprising:
    a plurality of lower resolution imagers for acquiring a plurality of lower resolution source images;

a lower resolution composite image generator for generating a lower resolution composite image from said plurality of said lower resolution images;
at least one higher resolution imager for acquiring a plurality of higher resolution source images;
a higher resolution composite image generator for generating a higher resolution composite image from said plurality of said higher resolution images;
a lower resolution combiner for combining said lower resolution images to form a first resolution layer of an overall seamless composite image, wherein said combining is performed using said plurality of lower resolution images without requiring overlap of image regions of said plurality of said lower resolution images;
a higher resolution combiner for combining said higher resolution images to form a second resolution layer of a portion of said overall seamless composite image, wherein said combining is performed using said plurality of higher resolution images without requiring overlap of image regions of said plurality of said higher resolution images, wherein digital objects are embedded within said higher resolution composite image, wherein said digital objects are selectable to provide additional imagery interaction options; and
a composite image generator for layering said lower resolution composite images and said higher resolution images to produce a layered composite image having a plurality of resolutions therein.

8. The multi-imager system of claim 7 further comprising:
a plurality of short focal length imagers in said multi-imager system for acquiring said plurality of lower resolution source images; and
at least one longer focal length imager in said multi-imager system for acquiring said plurality of higher resolution source images.

9. The multi-imager system of claim 7 further comprising:
a border blender for blending at least one edge portion of said second resolution layer with a portion of said first resolution layer without requiring blending of other than the at least one edge portion of said second resolution layer with said portion of said first resolution layer.

10. The multi-imager system of claim 7 further comprises:
a lower resolution color imager for acquiring said plurality of lower resolution images in color;
a higher resolution black and white imager for acquiring said plurality of higher resolution images in monochrome; and
a color layer blender for blending said color from said first resolution layer with said monochrome of said second resolution layer to obtain higher resolution color images at a reduced bandwidth.

11. The multi-imager system of claim 7 further comprising:
wherein said plurality of imagers are a part of a pan tilt zoom (PTZ) imaging system that provides frame selection within said composite image.

12. A computer-useable medium having computer-readable program code stored thereon for causing a computer system to execute a method for producing seamless composite images having non-uniform resolution from a multi-camera system, comprising:
acquiring a plurality of lower resolution source images from a plurality of short focal length cameras in said multi-camera system;
blending said plurality of lower resolution source images to form a first resolution layer of an overall scene;
acquiring a plurality of higher resolution source images from at least one long focal length camera in said multi-camera system;
blending said plurality of higher resolution source images to form a second resolution layer of a portion of said overall scene;
embedding digital objects within said second resolution layer, wherein said digital objects are selectable to provide additional imagery interaction options; and
overlayering portions of said higher resolution layer and said lower resolution layer to produce a composite image with a plurality of source images having a plurality of resolutions therein.

13. The computer-useable medium having computer-readable program code stored thereon of claim 12 further comprising:
utilizing a combiner for blending said plurality of said lower resolution source images; and
utilizing said combiner for blending said plurality of higher resolution source images,
wherein said combiner combines said plurality of source images to produce a seamless composite image without requiring overlap of image regions of said plurality of source images.

14. The computer-useable medium having computer-readable program code stored thereon of claim 12 wherein after further comprising:
shaping said blending of said plurality of said lower resolution images and said plurality of said higher resolution images into a previously defined shape.

15. The computer-useable medium having computer-readable program code stored thereon of claim 12 further comprising:
blending at least one edge portion of said second resolution layer with a portion of said first resolution layer without requiring blending of other than the at least one edge portion of said second resolution layer with said portion of said first resolution layer.

16. The computer-useable medium having computer-readable program code stored thereon of claim 12 further comprising:
acquiring said plurality of lower resolution images in color;
acquiring said plurality of higher resolution images in monochrome; and
blending said color from said first resolution layer with said monochrome of said second resolution layer to obtain higher resolution color images at a reduced bandwidth.

17. The computer-useable medium having computer-readable program code stored thereon of claim 12 wherein said plurality of cameras are a part of a pan tilt zoom (PTZ) imaging system that provides frame selection within said composite image.

* * * * *